United States Patent
Dey et al.

(10) Patent No.: US 9,877,058 B2
(45) Date of Patent: Jan. 23, 2018

(54) PRESENTING PERSONALIZED ADVERTISEMENTS ON SMART GLASSES IN A MOVIE THEATER BASED ON EMOTION OF A VIEWER

(71) Applicant: INTERNATIONAL BUSINESS MACHINES CORPORATION, Armonk, NY (US)

(72) Inventors: Kuntal Dey, New Delhi (IN); Vijay Ekambaram, Bangalore (IN); Seema Nagar, Bangalore (IN); Swati Rallapalli, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/956,534

(22) Filed: Dec. 2, 2015

(65) Prior Publication Data
US 2017/0164029 A1    Jun. 8, 2017

(51) Int. Cl.
*H04N 21/2668* (2011.01)
*H04N 21/25* (2011.01)
*H04N 21/262* (2011.01)
*H04N 21/442* (2011.01)
*H04N 21/414* (2011.01)
*H04N 21/81* (2011.01)
(Continued)

(52) U.S. Cl.
CPC ....... *H04N 21/2668* (2013.01); *H04N 21/252* (2013.01); *H04N 21/26266* (2013.01); *H04N 21/41407* (2013.01); *H04N 21/4316* (2013.01); *H04N 21/44218* (2013.01); *H04N 21/4532* (2013.01); *H04N 21/812* (2013.01)

(58) Field of Classification Search
CPC ............... H04N 21/252; H04N 21/812; H04N 21/26266; H04H 20/10
USPC .......................................................... 725/10
See application file for complete search history.

(56) References Cited

U.S. PATENT DOCUMENTS 7,881,702 B2    2/2011  Heyworth et al.
8,145,528 B2    3/2012  Gilley et al.
(Continued)

FOREIGN PATENT DOCUMENTS

EP        1782373       11/2009
WO    2006016365        2/2006

OTHER PUBLICATIONS

Charles Arthur, "UK company's 'augmented reality' glasses could be better than Google's", http://www.theguardian.com/technology/2012/sep/10/augmented-reality-glasses-google-project, Sep. 10, 2012.
(Continued)

*Primary Examiner* — Nathan Flynn
*Assistant Examiner* — Caroline Somera
(74) *Attorney, Agent, or Firm* — F. Chau & Associates, LLC

(57) ABSTRACT

A method for presenting advertisements based on emotion of a viewer is provided. A first emotional state of a viewer wearing smart glasses is detected using first sensor data captured by a sensor of the glasses. A rate is set according to the detected first emotional state. A set of advertisements is displayed on the smart glasses according to the set rate while a movie is played so that the advertisements are perceived by the viewer as overlaying the movie.

16 Claims, 7 Drawing Sheets

(51) Int. Cl.
  *H04N 21/431* (2011.01)
  *H04N 21/45* (2011.01)

(56) References Cited

U.S. PATENT DOCUMENTS

| | | | |
|---|---|---|---|
| 8,910,201 B1* | 12/2014 | Zamiska | H04N 21/44222 725/34 |
| 9,363,569 B1* | 6/2016 | Van Hoff | G06Q 30/0263 |
| 2004/0059625 A1* | 3/2004 | Schrader | G06Q 30/02 705/7.32 |
| 2004/0181819 A1 | 9/2004 | Theiste et al. | |
| 2007/0055986 A1* | 3/2007 | Gilley | G06Q 30/0241 725/34 |
| 2008/0007567 A1* | 1/2008 | Clatworthy | G06Q 30/02 345/619 |
| 2010/0023399 A1 | 1/2010 | Sahni et al. | |
| 2010/0088716 A1 | 4/2010 | Ellanti et al. | |
| 2010/0228592 A1 | 9/2010 | Anderson et al. | |
| 2011/0164319 A1* | 7/2011 | Contant | G02B 27/26 359/465 |
| 2012/0324494 A1* | 12/2012 | Burger | H04H 60/33 725/12 |
| 2013/0231999 A1 | 9/2013 | Emrich et al. | |
| 2014/0207559 A1* | 7/2014 | McCord | G06Q 30/0242 705/14.41 |
| 2014/0223462 A1* | 8/2014 | Aimone | H04N 21/42201 725/10 |
| 2014/0317646 A1* | 10/2014 | Garza | H04N 21/44218 725/12 |
| 2015/0143404 A1* | 5/2015 | Byers | G06Q 30/0251 725/32 |
| 2016/0125465 A1* | 5/2016 | Kulkarni | G06F 3/04883 705/14.57 |
| 2016/0148055 A1* | 5/2016 | Zilberstein | G06K 9/00765 386/241 |
| 2016/0189268 A1* | 6/2016 | Gandhi | G06Q 30/0623 705/26.61 |
| 2016/0225012 A1* | 8/2016 | Ha | G06F 3/013 |

OTHER PUBLICATIONS

"10 Forthcoming Augmented Reality & Smart Glasses You Can Buy", http://www.hongkiat.com/blog/augmented-reality-smart-glasses, Feb. 11, 2015.

* cited by examiner

PRESENTING PERSONALIZED ADVERTISEMENTS ON SMART GLASSES IN A MOVIE THEATER BASED ON EMOTION OF A VIEWER

BACKGROUND

The present invention relates to presenting personalized advertisements, and more particularly, to presenting personalized advertisements in a movie theater based on emotion of a viewer.

Generally, three-dimensional (3D) movies displayed in a movie theater require a viewer to wear glasses to experience the movie in 3D. Typically, an admission ticket to a 3D movie costs more than an admission ticket to a two-dimensional (2D) movie. Accordingly, a movie theater might consider making 3D movies more affordable to movie-goers by incentivizing the movie-goers to view advertisements (Ads) while the 3D movie is playing. For example, the movie theater may offer a reduced cost ticket to a 3D movie-goer who agrees to watch Ads during the movie. However, some movie-goers might opt for a non-incentivized 3D movie experience. Thus, no Ads will be displayed to them. Accordingly, for the same movie performance, Ads may need to be shown to some movie-goers but not to all movie-goers.

Thus, there is a need to accommodate both types of movie-goers during the same movie performance.

SUMMARY

According to an exemplary embodiment of the present invention, a method for presenting advertisements based on emotion of a viewer includes detecting a first emotional state of a viewer wearing smart glasses using first sensor data captured by a sensor of the glasses. A rate is set according to the detected first emotional state. A set of advertisements is displayed on the smart glasses according to the set rate while a movie is played so that the advertisements are perceived by the viewer as overlaying the movie.

According to an exemplary embodiment of the present invention, an apparatus for presenting advertisements based on emotions of a viewer includes a frame including a display glass, an eye movement sensor, a memory storing a computer program, and a processor configured to execute the computer program. The computer program is configured to detect a first emotional state of a viewer wearing the frame using first sensor data captured by the sensor, set a rate according to the detected first emotional state, and display a set of advertisements on the display glass according to the set rate while a movie is played so that the advertisements are perceived by the viewer as overlaying the movie.

According to an exemplary embodiment of the present invention, a system for presenting advertisements based on emotions of a viewer includes smart glasses configured to detect a first emotional state of a viewer using first sensor data captured by a sensor, set a rate according to the detected first emotional state, and display a subset of advertisements according to the set rate while a movie is played so that the advertisements are perceived by the viewer as overlaying the movie. A server is configured to send a set of advertisements comprising the subset to the smart glasses.

BRIEF DESCRIPTION OF THE SEVERAL VIEWS OF THE DRAWINGS

Through the more detailed description of some embodiments of the present disclosure in the accompanying drawings, features of the present disclosure will become more apparent, wherein.

DETAILED DESCRIPTION

Figure 1:
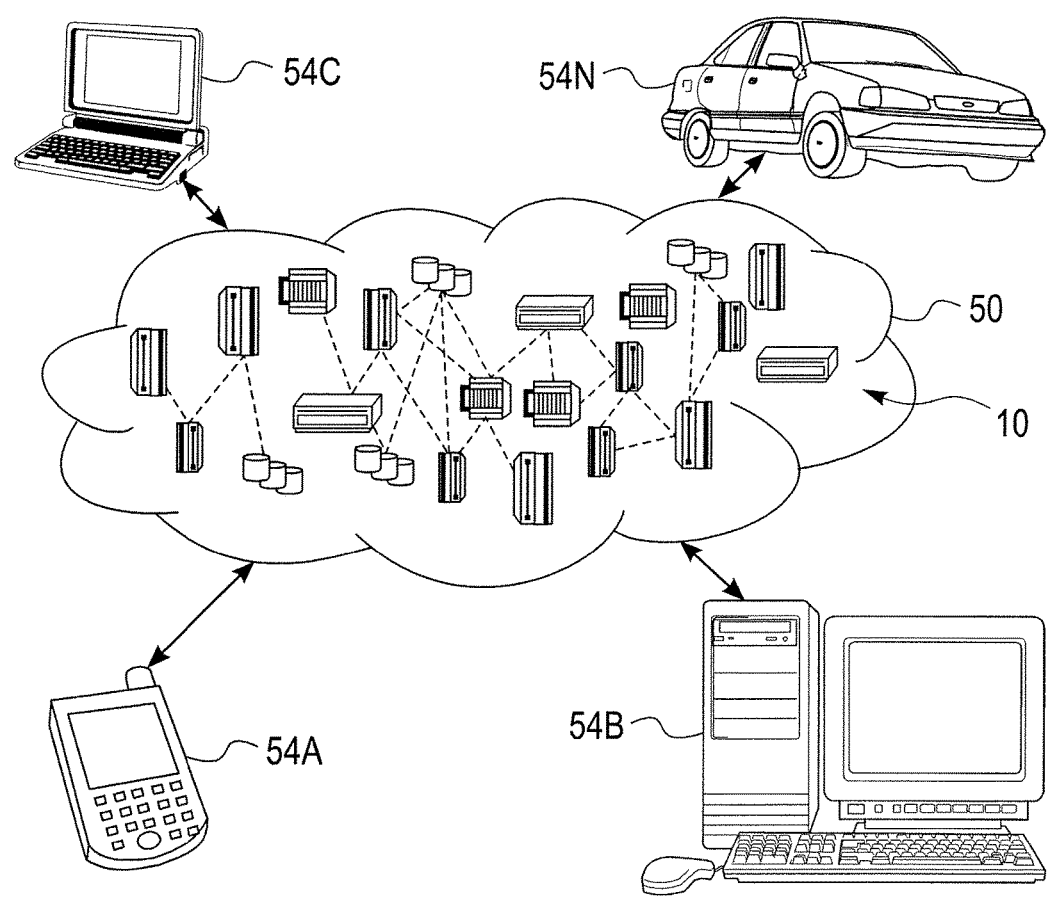
FIG. 1 illustrates a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes. Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
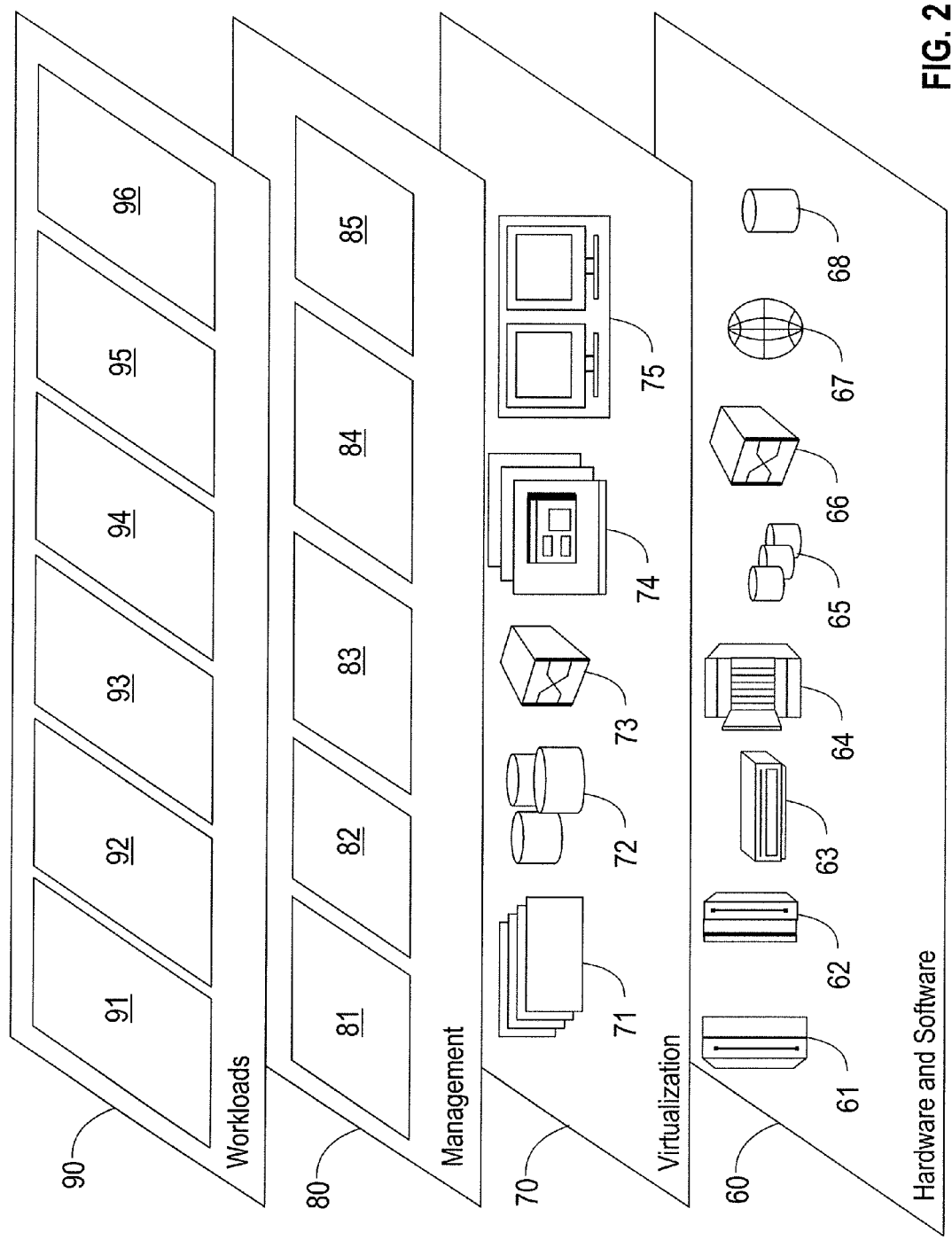
FIG. 2 depicts abstraction model layers according to an embodiment of the present invention, which may be used to implement a validator processing unit.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and an advertisement processing unit 96. The functions performed by server 220, which will be discussed below in more detail with respect to FIG. 4-7 may be performed by the advertising processing unit 96.

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

A movie theater that shows three-dimensional (3D) movies may offer movie-goers an option to watch advertisements (Ads) during the screening of the 3D movie to reduce the 3D movie admission cost. Each viewed Ad may reduce the 3D movie admission cost by a predetermined amount. Accordingly, the more Ads a movie-goer sees during the 3D movie, the more his or her admission cost will be reduced.

Generally, a movie-goer wears glasses to experience a movie in 3D. The glasses can be smart glasses (e.g., glasses that include a computer, a glass or plastic lens (e.g., display glass) on which information processed by the computer may be displayed on, sensors, microphones, and the like) and the Ads can be displayed on the glasses as being superimposed or overlaid on the movie. The 3D movie is displayed on a movie theater screen and perceived by the movie-goer in 3D through the smart glasses.

When the movie-goer chooses to watch Ads during a 3D movie, a set of Ads to be displayed during the movie is selected based on the type of movie chosen. Each Ad is mapped (e.g., linked) to a particular object displayed on a particular movie frame. A movie frame may be a still image component of a movie.

For a different 3D movie experience, an Ad frequency corresponding to a number of Ads displayed over a predetermined amount of time during the movie is selected based on the movie-goer's interest in the movie. In addition, each Ad is displayed on an uninteresting part of a frame. The Ad frequency may be changed during the movie according to the movie-goer's emotional state. In addition, a movie-goer may have the option to stop the Ads. Different movie-goers watching the same 3D movie may see different Ads at different frequencies and different times.

Figure 3:
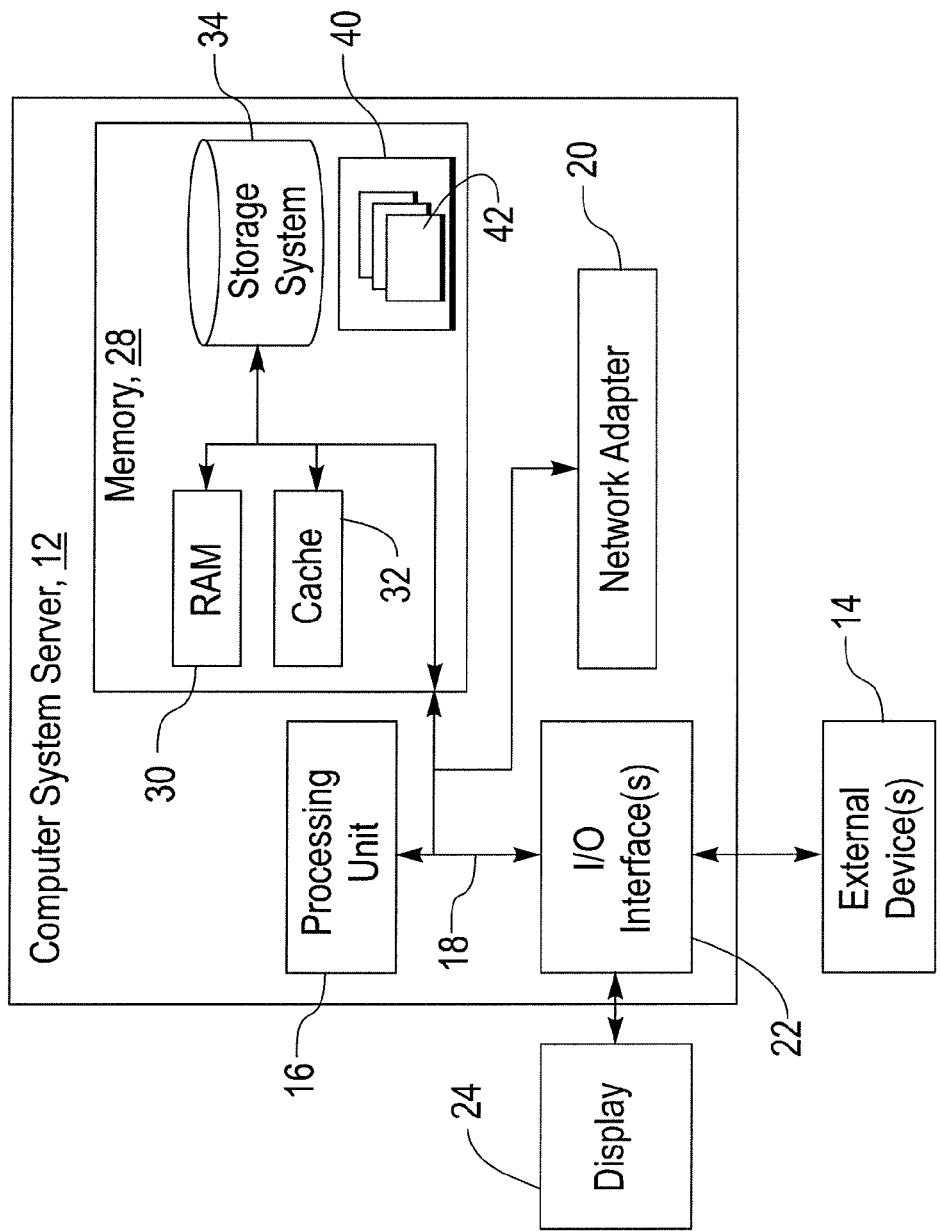
FIG. 3 shows an exemplary computer system/server, which is applicable to implementing embodiments of the present invention.

FIG. 3 illustrates an embodiment of a computer server that may be used to implement part of computing devices 54A-54N and advertisement processing unit 96, which is applicable to implementing embodiments of the present invention. Computer system/server 12 is only illustrative and is not intended to suggest any limitation as to the scope of use or functionality of embodiments of the invention described herein.

As shown in FIG. 3, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32.

The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 4:
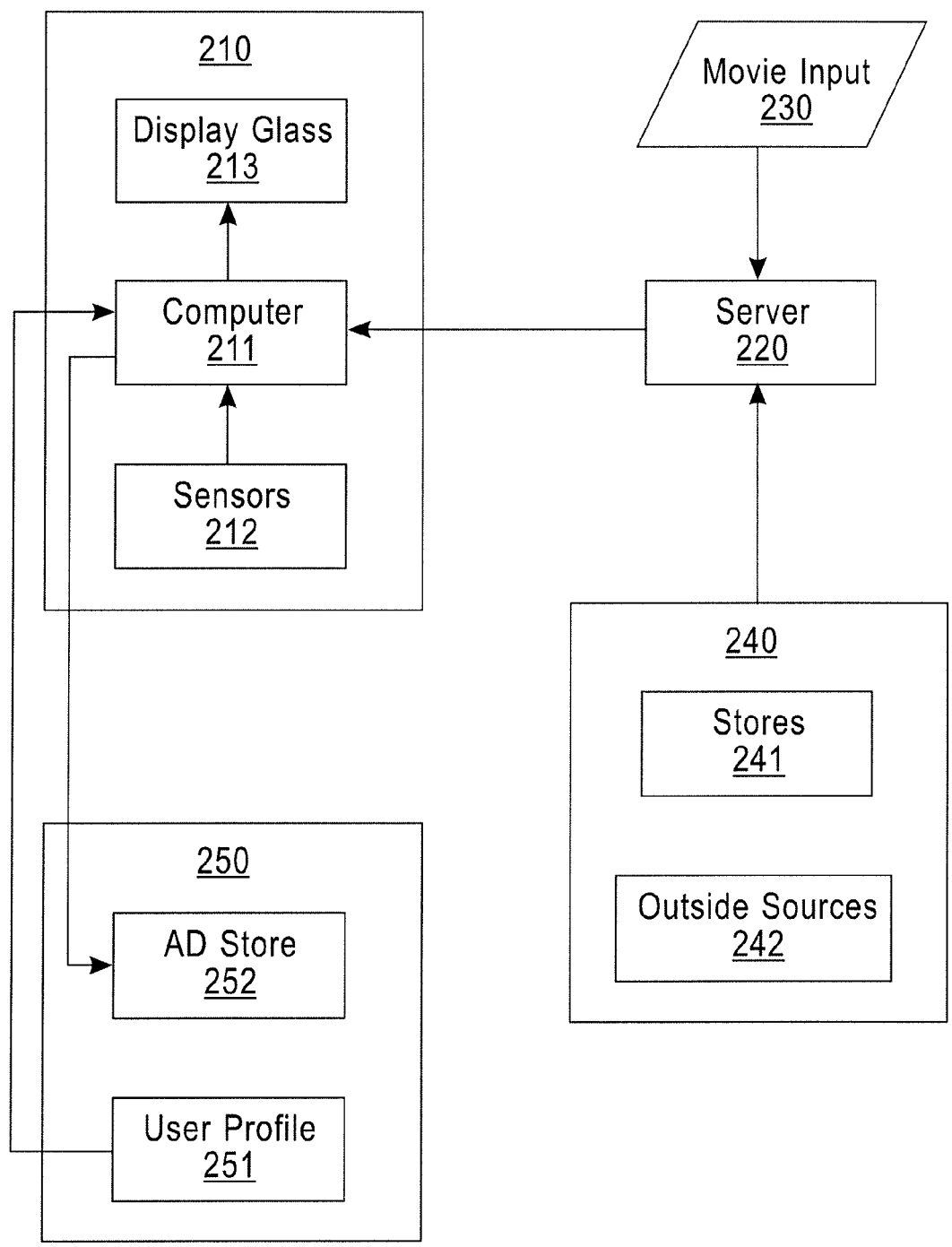
FIG. 4 shows a system for presenting advertisements based on emotion of a viewer according to embodiments of the present invention.

FIG. 4 shows a system for presenting advertisements based on emotion of a viewer according to an exemplary embodiment of the invention. Referring to FIG. 4, the system includes smart glasses 210, a mobile device 250, a server 220, and Ad sources 240.

The Ad sources 240 may include a plurality of stores 241 and outside sources 242. The stores 241 may be included in a mall that includes a movie theater that displays 3D movies. The stores 241 may include, for example, an apparel store, a home improvement store, a shoe store, a candy store, and the like. Each of the stores 241 may have one or more Ads featuring their products.

An Ad may be an image of a product or a video of a product. According to an embodiment, an Ad is a still image of a product. For example, the shoe store may have a first Ad featuring a rugged hiking shoe and a second Ad featuring a stiletto shoe. The outside sources 242 may include commercial entities that do not include establishments (e.g., stores) located in the mall, each of which having its own Ads featuring its products.

The Ads of the stores 241 and outside sources 242 are transferred to a server 220. Each Ad of the Ad sources 240 may include metadata regarding the objects displayed in the Ad. For example, the shoe store Ad featuring the stiletto shoe may include metadata describing the stiletto shoe as a woman's shoe, a stiletto shoe, a heeled-shoe, a formal shoe, a fashionable shoe, and the like.

The server 220 may store the Ads of the Ad sources 240 and may select a set of Ads, from among the stored Ads, to display to a viewer of a 3D movie based on a movie input 230. The server 220 may be a computer similar to the computer described above with reference to FIG. 3. The server 220 may be disposed in the mall where the movie theater displaying the 3D movie is located, inside the movie theater, in a safe location outside of the mall, or in the cloud.

The movie input 230 includes a 3D movie that a movie-goer has chosen to watch. In addition, the movie input 230 includes metadata regarding objects displayed in the 3D movie (e.g., on different frames of the movie). The movie input 230 may include metadata describing a type of the 3D movie, for example, an action movie, a drama, a comedy, or the like. The movie input 230 may include metadata about each frame of the selected 3D movie, describing, for example, each object displayed on each frame of the movie and interesting and uninteresting areas of each frame.

The server 220 may select the set of Ads to be displayed during a particular movie based on the metadata of the selected 3D movie and the metadata of the Ads of the Ad sources 240. For example, the server 220 may use classifiers to match the metadata of the selected movie with the metadata of the Ads received from the Ad sources 240. The server 220 may transfer the set of Ads to be displayed during a particular movie to a computer 211 of a wearable glass 210.

A mobile device 250 may be a handheld mobile device, a wireless phone, a tablet computer, or the like, in the possession of the movie-goer. The mobile device 250 may be communicatively coupled to the computer 211 of a wearable glass 210 using, for example, standard protocols. The mobile device 250 may include a user profile 251 and an Ad store 252. The user profile 251 may include personal information about the movie-goer such as the movie-goer's name, address, age, and other information such as the movie-goer's interests, hobbies, personal preferences, and the like. The Ad store 252 may include a plurality of Ads that the movie-goer may watch during his or her leisure time in the mobile device 250. These Ads may be input to the Ad store 252 by the computer 211. The Ad store 252 stores the Ads that a user (e.g., movie-goer) likes (e.g., determined based on gaze, winks, etc.)

The wearable glass 210 may be worn on the head of the movie-goer. The wearable glass 210 may include one or more sensors 212, the computer 211, a display glass 213 attached to a frame of the wearable glass 211, a microphone, and speakers that may be disposed on the movie-goer's ears. The display glass 213 may be a glass or plastic lens disposed in front on the movie-goer's eyes. The display glass 213 may display the 3D movie and the Ads selected by the server 220. The display glass 213 may display the Ads as being superimposed on the 3D movie. For example, projector may be used to project a 3D movie on a movie theater screen for a plurality of movie-goers to watch. Each movie-goer wears his/her corresponding wearable glass 210. Each movie-goer perceives the 3D movie in 3D through the display glass 213.

The Ads are displayed on the display glass 213 as superimposed on the 3D movie, for each movie-goer, from among the plurality of movie goers watching the same movie.

The computer 211 selects which Ads, from among the plurality of Ads selected by the server 220, to be displayed during the 3D movie, when to display the selected Ads as the movie is playing, and where to locate the Ads in each movie frame. For example, an Ad may be displayed in an uninteresting area of a frame, which may correspond to an uninteresting background, or to an area away from an interesting area of a particular movie frame, using the movie input 230 metadata. Virtual coordinates of the uninteresting areas of each frame may be included in the metadata included in the movie input 230. Uninteresting parts of a frame are parts of the frame where the system discovers few image features. For example, the image features may be detected using scale-intervariant feature transform (SIFT) and speeded up robust features (SURF) or even deep learning based object recognition techniques.

The sensors 212 of the wearable glass 210 may include sensors that capture input data that the computer 211 can use to determine the movie-goer's emotional state. The sensors 212 include sensors that detect facial muscle, eyeball, and eyebrow muscle position and movement. The input data of the sensors 212 includes the detected facial muscle, eyebrow muscle, and eyeball, and position. In addition, the input data of the sensors 212 may include movement of the eyeballs, eyebrows, and facial muscles of the movie-goer. The sensors 212 may also include a camera disposed on the frame or glass of the wearable glass 210, the camera being pointed to the movie-goer's face. The camera may capture images or video of the movie-goer's face. The input data of the sensors 212 includes the captured images or video of the movie-goer's face. The sensors 212 may continuously monitor the movie-goer (e.g., continuously detect facial muscle, eyebrow muscle, and eyeball position and movement as well as continuously capture images or videos of the movie-goer's face).

The computer 211 determines a first emotional state of the movie-goer using the input data obtained by the sensors 212. The computer 211 sets a first Ad display rate based on the first emotional state of the movie-goer. For example, the emotional state of the movie-goer may be determined to be that the movie-goer is interested or dis-interested in the movie when monitored by the sensors 212. When the movie-goer is interested in the movie, the first Ad display rate may be set to zero or to a number that is smaller than the first Ad display rate set when the movie-goer is disinterested in the movie.

When the movie-goer is interested in the movie, the first Ad display rate may be, for example, one Ad every three minutes. When the movie-goer is disinterested in the movie, the first Ad display rate may be, for example, three Ads every three minutes. The computer 211 may determine a second emotional state of the movie-goer at later period in time (e.g., after the first emotional state). The second Ad display rate may remain the same as that set based on the first emotional state, or the second Ad display rate may be decreased, depending on the second emotional state of the movie-goer. For example, if the second emotional state of the movie-goer is determined to be positive or non-negative (e.g., that the movie-goer shows a positive emotion or a non-negative emotion to a displayed Ad), the first Ad display rate may be maintained. If the second emotional state of the movie-goer is determined to be negative (e.g., that the movie-goer shows a negative emotion in response to a displayed Ad), the first Ad display rate may be decreased.

For example, the Ad display rate may be adjusted depending on the movie-goer's emotional response to the displayed Ads.

The computer 211 may continuously adjust the Ad display rate using the continuously determined emotional states of the movie-goer. In addition, the movie-goer may have the option to turn off the Ads.

According to an embodiment, the system of FIG. 4 may include a plurality of wearable glasses 210. The system of FIG. 4 may also include a plurality of mobile devices 250. Each wearable glass 210 of the plurality of wearable glasses 210 may be communicatively coupled to a corresponding mobile device 250. Each computer 211 of a wearable glass 210, from among the wearable glasses 210, may be connected to the server 220, and to an Ad store 252 and user profile 251 of a corresponding mobile device 250. A display glass 213 of a wearable glass 210 may display different Ads at different times from those displayed by another display glass 213 of another wearable glass 210. Accordingly, different movie-goers watching the same 3D movie in the same movie theater room may view different Ads, at different times and different frequencies (e.g., Ad display rate).

According to an embodiment, the system of FIG. 4 is used to display Ads to movie-goers watching a two-dimensional (2D) movie. All aspects of the present invention relating to displaying Ads during a 3D movie apply to displaying Ads during a 2D movie except for the movie not being perceived in 3D by movie-goers. The 2D movie is shown on a movie theater screen. The Ads are displayed on the display glass 213 as superimposed on the 2D movie, for each movie-goer, from among a plurality of movie goers watching the same 2D movie. Different movie-goers watching the same 2D movie in the same movie theater room may view different Ads, at different times and different frequencies.

Figure 5:
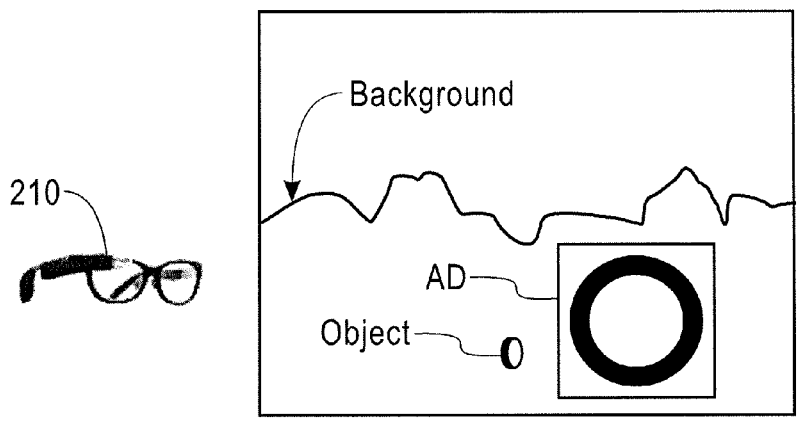
FIG. 5 illustrates a movie frame and an advertisement according to embodiments of the present invention.

FIG. 5 illustrates a movie frame and an advertisement according to an exemplary embodiment of the invention.

Referring to FIG. 5, a movie frame may correspond to a still image of the 3D movie. The frame may display a background, which may correspond, for example, to a mountain. An object may be displayed on the frame. The object may be, for example, a car tire. For ease of illustration, a car on which the tire may be mounted is not shown in FIG. 5. The Ad displays a car tire overlaid on the movie frame. Accordingly, the Ad is of a same or similar nature as that of the object displayed in the frame. The car tire displayed in the Ad may correspond to a car tire sold by one of the stores in the mall (e.g., a store from among the stores 241 of FIG. 4). The 3D movie frame illustrated in FIG. 5 may be displayed on the wearable glass 210 illustrated in FIG. 5.

Figure 6A:
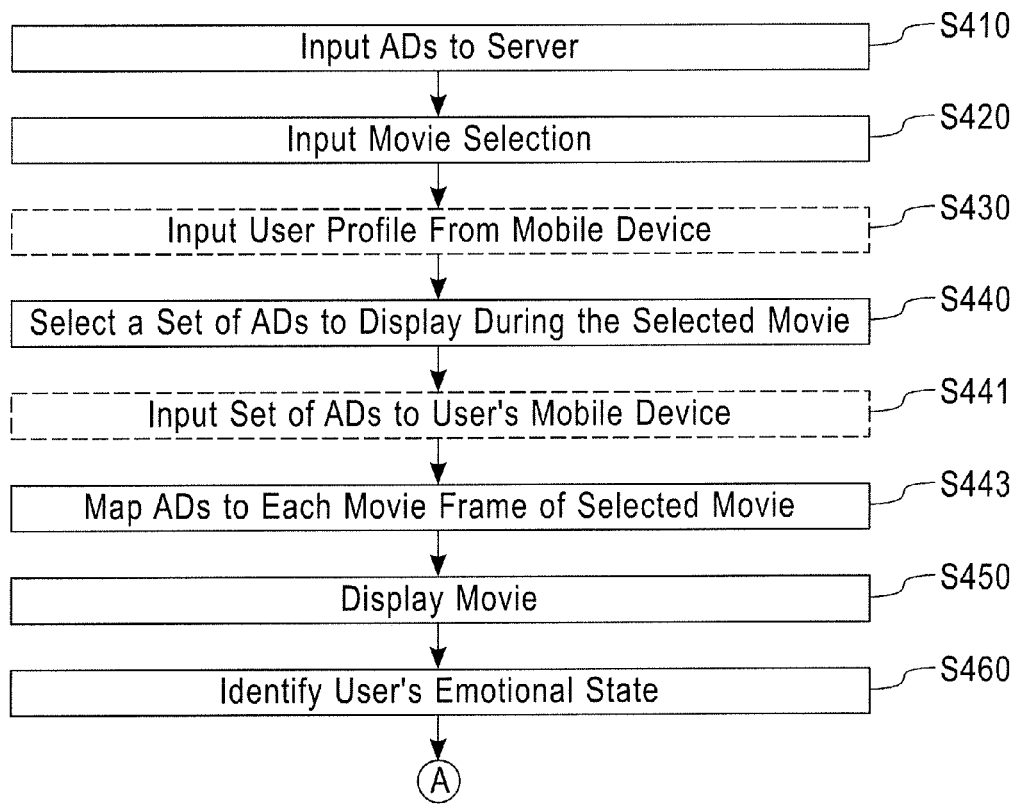
FIGS. 6A and 6B illustrate a method for using the system for presenting advertisements based on emotion of a viewer according to embodiments of the present invention.
Figure 6B:
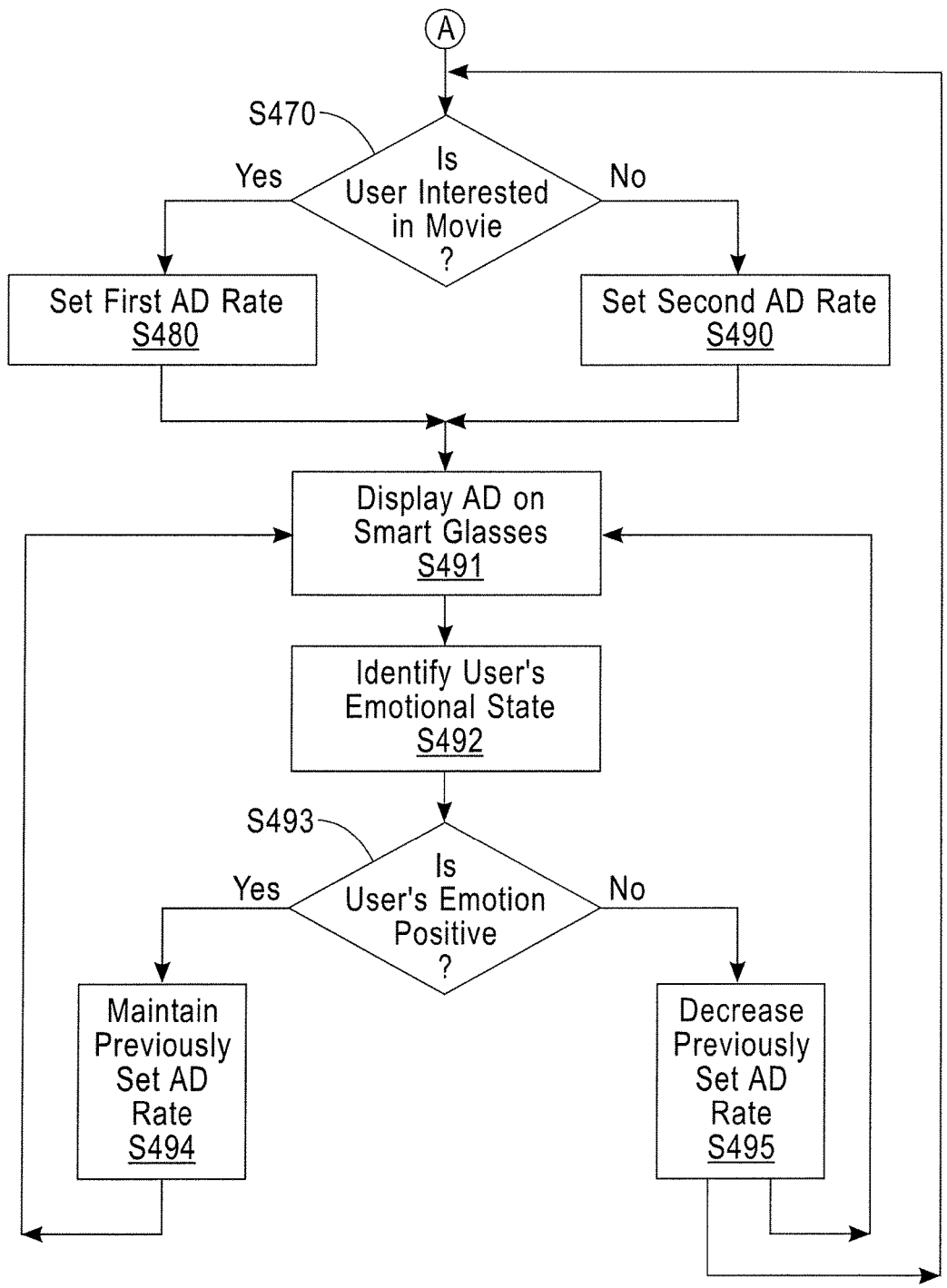

FIGS. 6A and 6B illustrate a method for using the system for presenting advertisements based on emotion of a viewer according to embodiments of the present invention.

According to an embodiment, the system for presenting advertisements based on emotion of a viewer, illustrated with reference to FIG. 4, can be used to perform the method steps of the method for using the system for presenting advertisements based on emotion of a viewer, illustrated with reference to FIGS. 6A and 6B.

Ads are input to a server in step S410. The server may correspond to the server 220 of FIG. 4. The Ads may originate from stores in a shopping mall in which a movie theater is located. In an embodiment, Ads may originate from sources which exclude the stores in the mall, for example, online retailers, restaurants not located in the mall, and the like. In an embodiment, Ads originating from stores in the shopping mall and Ads originating from sources which exclude the stores in the mall may be input to the server in step S410.

Each Ad input to the server in step S410 may include metadata describing objects displayed or featured in that Ad. For example, an automotive tire shop located in the mall may have an Ad featuring rugged, or off-road tires. The Ad may include, for example, an image of a rugged, or off-road tire. The metadata of this Ad may include keywords such as "tires," "rugged tires," "off-road tires," "performance tires," and the like.

The movie theater located in the above-mentioned shopping mall may display various 3D movies at various time periods. Each 3D movie displayed in the movie theater may include metadata about the contents of the movie. The metadata of the movie may include an annotation or description of objects displayed in the movie, the background, roads, buildings, waterways, and the like, displayed in the movie. Each 3D movie may include metadata about persons displayed in the movie, for example, metadata describing the actors, the articles of clothing worn by the actors, jewelry worn by the actors, and the like. In addition, each frame of each movie may be annotated with the metadata as described above. For example, in "Movie C," frame 1234, may be annotated with metadata describing the articles of clothing that an actor is wearing and that the actor is, for example, driving in a jungle. In "Movie C," the metadata of frame 1234 may also include, for example, a description of the background, objects located in the background, a virtual coordinate (e.g., coordinate) where an object is located in the 1234 frame, the articles of clothing that the actor is wearing, an identification of the actors displayed in that frame, coordinates of an uninteresting area of the frame, and coordinates of an interesting area of the frame. The above or alike metadata may be created for each frame of each movie displayed in the movie theater. The metadata may also include coordinates of each object and person shown in each frame. However, it is understood that the metadata of each frame is not limited to the above items.

A user may chose to watch a 3D movie in the above-mentioned shopping mall. For example, the user elects to watch "Movie C." The 3D movie that the user chooses to watch along with its metadata is input to the server in step S420.

The user may possess a mobile device on his/her person. The mobile device may include a user profile indicating personal data of the user such as the user's name, address, age, gender, and the like. In addition, the user profile may include information such as objects that the user likes, owns, or would like to own, activities that the user likes, social clubs that the user is affiliated with, and the like. In step S430, the user profile is output from the user's mobile device and is input to the server.

In an embodiment, step S430 is optional. Accordingly, in an embodiment, the user profile is not input to the server.

In step S440, a set of Ads to be displayed during the 3D input in step S420 are selected from among all the Ads input to the server in step S410. This may be done by a classifier/matching engine running in the server that matches the metadata of the input Ads with the metadata of the movie chosen by the user. The classifier/matching engine may select the set of Ads to be displayed during the selected movie, for example, by comparing and matching the metadata of the selected movie with the metadata of the input Ads.

In addition, in step S440, the set of Ads may also be created based on a classification of the chosen movie and the classification of the input Ads. The classification of a movie may include a movie genre. For example, some Ads input in step S410 may be classified as Ads featuring sports gear. A 3D movie chosen in step S420 may be classified as an action movie. A match may be made between an action movie and sports gear. For example, actors in the action movie may wear sports gear. Accordingly, the Ad featuring sports gear may be included in the set of Ads to be displayed when showing the action movie.

In an embodiment, a set of Ads to be displayed in each respective 3D movie showing in the theater, may be determined before the user selects a movie that he or she would like to watch. In this case, in step S440, when the user chooses a 3D movie of his or her liking, the set of Ads to be displayed during the chosen movie is known.

In an embodiment, in steps S441, the set of Ads to be displayed during the chosen movie may be input to the user's mobile device when the user profile is input from the user's mobile device in step S430. For example, the Ads may be input to the Ad store 252 of the mobile device 250 shown in FIG. 4. The user may view the Ads input to his or her mobile device at his or her convenience at a later time.

In step S443, each Ad, from among the set of Ads selected for display in step S440, may be mapped (e.g., linked or set to correspond) to each movie frame of the movie selection input in step S420. The objects and/or people displayed in each frame of the movie may be identified in the metadata of the movie.

In an embodiment, the objects and/or people displayed in each frame of the movie may be detected in real-time using object recognition techniques. When detecting objects and/or people in real-time, the object recognition technique may include software running in the smart glasses or in the server that can detect and identify each object and/or person displayed in each movie frame in real-time. Metadata of the identified objects may be determined, for example, using the internet or online services. The metadata of the Ads can be matched with the metadata of each frame or with the real-time identification of each object and/or person in each frame. When real-time object identification is used, the identified object may be matched with the metadata of the set of Ads to select an Ad that matches the real-time identified object. Accordingly, Ads may be mapped to specific objects and/or persons displayed in each movie frame.

For example, when frame 1234 of "Movie C" shows an actor sitting in a car, the actor wearing jewelry and driving near a hiking trail, an Ad featuring hiking shoes may be mapped to frame 1234. Accordingly, when frame 1234 of "Movie C" is displayed on the movie-goer's smart glasses, the hiking shoe Ad may be displayed on the movie-goer's glasses as superimposed on the image of frame 1234.

In step S450, the 3D movie selected by the user in step S420 is displayed on the movie theater screen and is perceived in 3D through the smart glasses that the user is wearing.

According to an embodiment, in step S450, a 2D movie is shown on the movie theater screen and perceived in 2D through the smart glasses that the user is wearing. All steps of the method for using the system for presenting Ads based on emotion of a viewer with respect to FIGS. 4A and 4B apply to 2D movies. Accordingly, a plurality of users wearing smart glasses while watching the same 2D movie in a movie theater screen may view different Ads overlaid on their respective smart glasses at different frequencies and different times.

In step S460, a user's emotional state is determined using sensors disposed on the smart glasses. The sensors disposed on the smart glasses may correspond to the sensors 212 of the wearable glass 210 described above, with reference to FIG. 4. In an embodiment, in step S460, the user's emotional state is continuously determined in real-time.

The user's emotional state may be determined by modeling detected muscle, eyebrow muscle, and eyeball position and movements. In addition, the user's emotional state may be determined by analyzing images or videos of the movie-goer's face obtained by the sensors. The user's emotional state may also be determined by interpreting facial gestures, expressions, or gaze of the user as captured in the images or video by the sensors. The user's emotional state may indicate that the user is, for example, bored, happy, not too happy, ambivalent, excited, not too excited, sad, angry, nervous, fearful, or the like.

In step S470, it is determined whether the user is interested in the 3D movie that he or she is watching on the smart glasses. Whether the user is interested in the movie is determined based on the emotional state of the user identified in step S460. According to an embodiment, the user is identified as being interested in the movie when an analysis of the sensor data gathered in step S460 indicates that the user is happy or excited. According to an embodiment, the user is identified as being dis-interested in the movie when an analysis of the sensor data gathered in step S460 indicates that the user is bored or has a level of interest less than a threshold amount. The threshold amount may be predetermined.

When it is determined that the user is interested in the 3D movie, a first Ad display rate is set in step S480. According to an embodiment, the first Ad display rate is zero. No Ads are displayed to the user when the Ad display rate is zero. According to an embodiment, the first Ad display rate is a positive non-zero integer. For example, the first Ad display rate may be 4 Ads per every 5 minutes of movie time.

In step S491, the Ads mapped to the movie frames in step S443 are displayed on the user's smart glasses according to the first Ad rate set in step S480. In step S491 it is determined (e.g., selected) which Ads will be displayed and where, for example, the coordinates of the movie frame where the selected Ads will be displayed.

According to an embodiment, when the user profile is input in step S430, the determination of which Ads to be displayed to the user is made by taking in consideration the information included in the user profile. For example, when the user profile indicates that the user likes jewelry, and a movie frame includes both jewelry and outdoor sports gear, a jewelry Ad may be displayed on that frame while an outdoor sports gear Ad might not be displayed. In addition, the determination of which Ads to be displayed to the user may be made by comparing the metadata of the movie associated with a detected object against the meta-data of the selected Ads.

According to an embodiment, when the user profile is not input in step S430, an Ad to be displayed on a particular frame is determined based on priority criteria such as, for example, a highest pay-per-display Ad (e.g., when a first Ad originator pays a first amount for displaying its Ad during the movie and a second Ad originator pays a second amount which is greater than the first amount for showing the second Ad, the second Ad will be displayed and the first Ad is not displayed). Since the metadata on objects on upcoming frames is known according to an embodiment, an Ad is selected to be displayed when the upcoming frame will be displayed based on priority criteria or user profile information data.

According to an embodiment, a plurality of Ads is displayed in the same movie frame. In some instances, Ads are not displayed in a movie frame. This may be because there are no identifiable objects or no metadata about objects in the frame, because the Ad display rate is zero, because the available Ads in the frame do not match with the user profile information, or because of an election to not display an available Ad in a particular frame.

In step S491, once the Ads to be displayed in a particular frame are selected, a location on the movie frame, or coordinates of the movie frame where the Ad will be displayed are determined. Frame coordinates where an Ad will be displayed may be determined by the metadata of the frame, which indicate what parts of the frame are uninteresting, to increase movie-watching experience by placing Ads away from parts of the frame that the user may be interested in watching. In addition, frame coordinates for Ad displaying may be determined by using the object recognition techniques discussed above, which may determine uninteresting parts of the movie frame. As discussed above, uninteresting parts of a frame are parts of the frame where the system discovers few image features. In an exemplary embodiment, uninteresting parts of a frame and objects and persons displayed on the frame are recognized using the SIFT or SURF object recognition techniques. In the embodiment, an interesting part of the frame includes features that are equal to or greater than a threshold amount of features extracted using SIFT or SURF. A non-interesting part of a frame includes a number of extracted features that is less than the threshold amount. The invention is not limited to use of SIFT or SURF algorithms. For example, deep learning based object recognition techniques or other object recognition techniques may be used.

Accordingly, Ads may be displayed in uninteresting parts of a frame. In an embodiment, Ads are displayed in uninteresting parts of a frame that are near or adjacent to a corresponding reference object displayed on the frame. For example, a car tire Ad may be disposed in an uninteresting area adjacent to a car tire shown in the movie (e.g., in the movie frame, the car tire can be part of a wheel of a moving car).

In an embodiment, Ads are displayed in a rectangular area, and the rectangular area including the Ad may be disposed in an uninteresting area that is close or adjacent to the object of reference that corresponds to the Ad. For example, as shown in FIG. 5, a car tire "Ad" is disposed near a tire object of reference "Object" in an uninteresting area of the frame. In FIG. 5, the uninteresting area of the frame may correspond to a blank area.

According to an embodiment, sensor data including the gaze of the movie-goer or an area of the frame that the movie-goer is looking at, determined by the gaze or eyeball tracking of the movie-goer, is used to determine where to overlay an Ad on a frame. For example, an eyeball tracking or gaze of the user may indicate that the user is looking or focusing on an upper left area of a movie frame. An Ad may be displayed on the upper left area of the movie frame, in an uninteresting part of the upper left area of the movie frame.

Accordingly, in step S491, the Ads selected for displaying may be displayed (e.g., overlaid) on the corresponding frames in uninteresting parts of the frame that are near or adjacent to the object of reference of the Ad, or in uninteresting part of a portion of a frame that the movie-goer is focusing on. When two or more Ads are shown in the same frame, each Ad may be displayed in an uninteresting area of the frame near or adjacent to the corresponding object of reference. For example, in the same frame, a car tire Ad may be displayed near a wheel of a car shown in the movie frame and a hiking shoe Ad may be displayed near a hiking trail shown in the movie frame.

In step S492 a user's emotional state may be identified using the sensors of the smart glasses as described above. In an embodiment, in step S492 the user's emotional state is identified after the first Ad is displayed. For example, the user's emotional state may be identified while the Ad is being displayed, immediately after the Ad has been shown, or a short time after the Ad has been shown.

When the user's emotion identified in step S492 is positive, the Ad display rate previously set in step S480 is maintained in step S494. Accordingly, Ads continue to be displayed to the user at the rate set in step S480. Then, the method may loop to step S491 to display additional Ads to the user at the rate set in step S480.

When the user's emotion identified in step S492 is not positive, or is negative, the Ad display rate previously set in step S480 is decreased in step S495. The rate may be decreased by a predetermined amount, for example, the Ad display rate may be decreased by 1 Ad per minute. The method then may loop to step S491 to display Ads to the user at the reduced Ad display rate set in step S495.

According to an embodiment, after decreasing the Ad display rate in step S495, the method may loop to step S470 to identify whether the user is interested in the movie.

According to an embodiment, after decreasing the Ad display rate in step S495, the user may be prompted to indicate whether he or she wishes to continue watching Ads or whether the user would like to turn off the Ads for the remainder of the movie. When the user elects to turn off the Ads, Ads will cease and the incentives (e.g., admission cost reduction) that the user accumulated may be determined based on the number of Ads that the user saw. When the user elects to continue watching Ads, the method may loop to step S470 or to step S460. The smart glasses may include a physical button/slider that can be depressed or slid to indicate they wish to stop receiving Ads.

According to an embodiment, when the user watches Ads during the entire length of the movie, the incentives that the user accumulated may be determined at the end of the movie based on the number of Ads that the user saw.

According to an embodiment, when in step S470 it is determined the user is not interested in the movie, a second Ad display rate is set in step S490. Accordingly, Ads will be displayed to the user at the second Ad display rate. In an embodiment, the second Ad display rate is higher than the first Ad display rate set in step S480.

After step S490, Ads may be displayed to the user according to the method described in step S491 described above.

In step S492, the user's emotional state may be determined as described above.

In step S493, the user's emotion is determined as described above.

When displaying Ads at the second Ad rate set in step S490, and the user's emotion is positive in step S493, in step S494 the second Ad rate is maintained as set in step S490 and the method may loop to display Ads to the user according to step S491.

When displaying Ads at the second Ad rate set in step S490, and the user's emotion is negative or non-positive in step S493, the second Ad rate set in step S490 is reduced in step S495, and the method may loop to step S491 or S470. In an embodiment, when displaying Ads at the second Ad rate set in step S490, and the user's emotion is negative or non-positive in step S493, the user may be prompted to indicate whether he or she would like to stop watching Ads.

In an exemplary embodiment, when the user returns the smart glasses to the theater at the end of the 3D movie, user profile information stored in the smart glasses is deleted. In addition, any new profile information inferred about the user from the smart glasses is transferred to the user's mobile device before being deleted. The new inferred profile information is transferred to the user profile 251 of the mobile device 250 of the system illustrated in FIG. 4.

Figure 7:
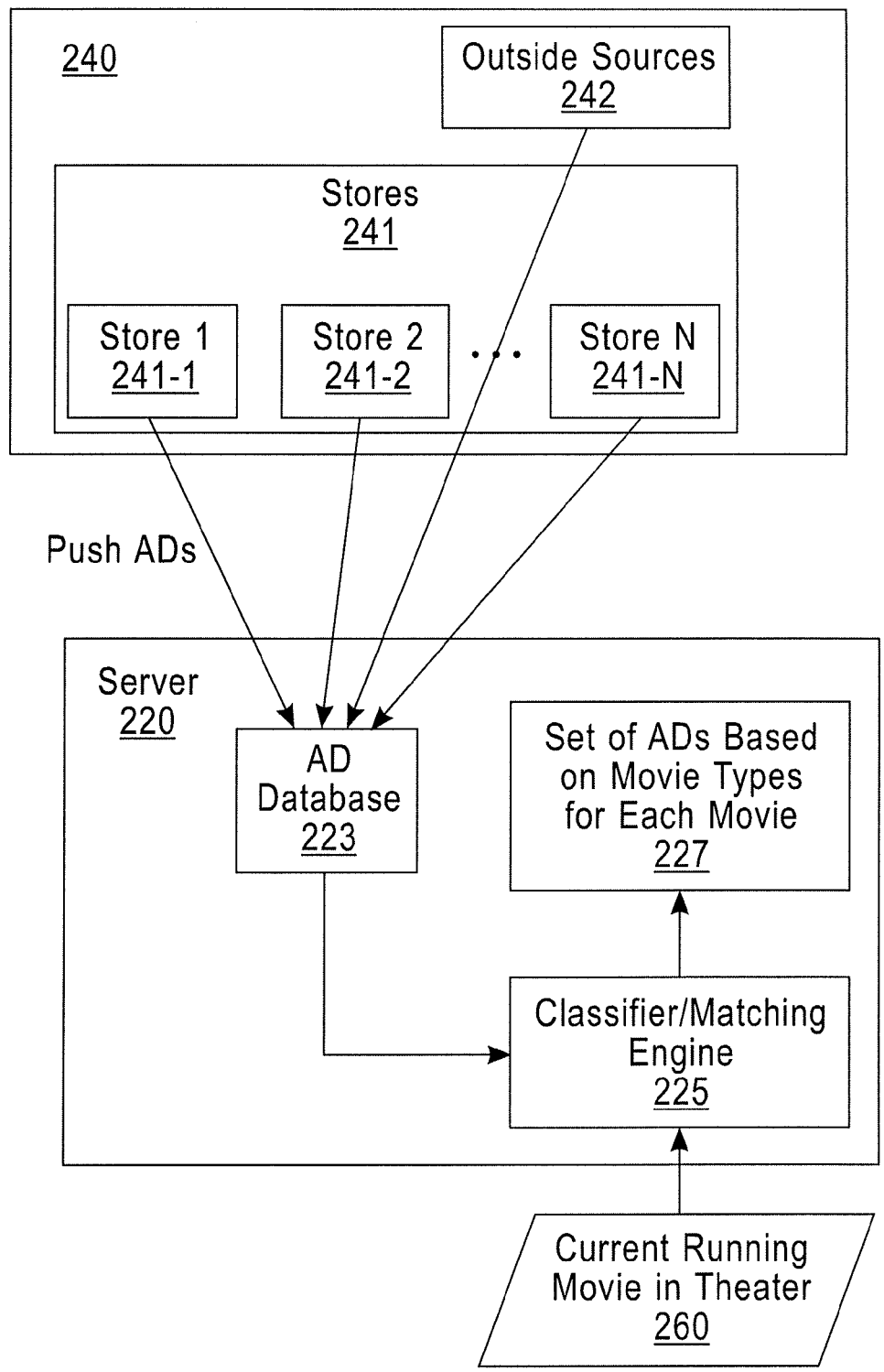
FIG. 7 illustrates a system used to select a set of advertisements based on movie metadata according to embodiments of the present invention.

FIG. 7 illustrates a system used to select a set of Ads based on movie metadata according to an embodiment of the present invention. Referring to FIG. 7, the system used to select a set of Ads based on movie metadata, according to an embodiment of the present invention, includes the Ad sources 240, the server 220, and current running movies in theater 260. The Ad sources 240 include the stores 241 and the outside sources 242. The stores 241 include a plurality of stores Store 1 241-1, and Store 2 241-2 to Store N 241-N. N is a positive nonzero integer.

The server 220 includes an Ad database 223, a classifier/matching engine 225, and a set of Ads based on movie types for each movie 227.

The current running movies in theater 260 includes a list of 3D movies playing in a theater. In addition, the current running movies in theater 260 includes metadata about each frame of each 3D movie playing in the theater. The current running movies in theater 260 includes the movie input 230 of FIG. 4, which is a movie that a movie-goer chooses to view.

Each of the stores Store 1 241-1 to Store N 241-N is communicatively coupled with the Ad database 223 and transfers Ads and the Ads' corresponding metadata to the Ad database 223. For example, each of the stores Store 1 241-1 to Store N 241-N pushes Ads and their corresponding metadata to the Ad database 223. In addition, the outside sources 242 push Ads and their corresponding metadata to the Ad database 223. The classifier/matching engine 225 performs a multi-label classification and tags each Ad to a set of movies based on a correlation or matching between the type of movie and the type of Ad pushed to the Ad database 223, using the metadata of the current running movies in theater 260 and the Ads' metadata. Based on the classification, an Ad mapping table is generated for each 3D movie that is playing in the theater. The Ad mapping table includes a set of Ads to be played for each 3D movie that can be selected by a movie-goer. The Ad mapping table is output to the set of Ads based on movie types for each movie 227.

According to an embodiment, the set of Ads based on movie types for each movie 227 is communicatively coupled with the computer 211 of the system of FIG. 4 and transfers to the computer 211 a set of Ads to be displayed during a particular movie selected by a movie-goer.

The system illustrated in FIG. 7 can be implemented in the system illustrated with reference to FIG. 4 and in the method illustrated with reference to FIGS. 6A and 6B.

The method described above may be performed in each of the plurality of the wearable glass 210 of the system described with reference to FIG. 4. Accordingly, different Ads may be displayed to different movie-goers at different times and different frequencies, according to the method steps described with reference to FIGS. 6A and 6B. It is to be understood that a movie theater located in a shopping mall is exemplarily described. The movie theater may be located anywhere that it is suitable, for example, in a yacht, cruise ship, aircraft, or the like. The movie theater may also be a stand-alone building built on a rural area or developed area.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for presenting advertisements based on emotion of a viewer, the method comprising:
    detecting a first emotional state of a viewer experienced in response to observing an initial advertisement, the viewer wearing smart glasses, the detecting using first sensor data captured by a sensor of the smart glasses;
    setting a rate to a first rate when the first emotional state indicates the viewer is experiencing a negative emotion towards the initial advertisement;
    setting the rate to a second rate when the first emotional state indicates the viewer is experiencing a positive emotion towards the initial advertisement, where the first rate is less than the second rate; and
    displaying a set of advertisements on the smart glasses according to the set rate while a movie is played so that the set of advertisements are perceived by the viewer as overlaying the movie,
    wherein the overlaying comprises:
        mapping each advertisement of the set to a given frame of the movie and a position within the frame,
        wherein the mapping comprises:
            detecting an object displayed on the frame;
            comparing meta-data of the movie associated with the detected object against meta-data of each advertisement of the set to select one of the advertisements of the set;
            determining a background image of the frame; and
            setting the position of the selected one advertisement to a first position in the frame that corresponds to the background image of the frame,
    wherein the set rate is a number of advertisements to display during a given time period.

2. The method of claim 1, further comprises:
    querying the viewer to indicate whether to continue presentation of the advertisements when the detected first emotional state corresponds to the negative emotion;
    setting the previously set rate to 0 when a response to the querying indicates that the presentation is not to continue; and
    maintaining the previously set rate when the response to the querying indicates the presentation is to continue.

3. The method of claim 1, wherein the positive emotion indicates the viewer is happy or excited.

4. The method of claim 1, wherein the negative emotion indicates the viewer is bored.

5. The method of claim 1, wherein the overlaying further comprises:
    selecting the set of the advertisements from a larger set of advertisements based on the meta-data associated with the movie and meta-data associated with the larger set of advertisements.

6. The method of claim 5, wherein the mapping further comprises:
    comparing meta-data within user profile information of the viewer against the meta-data of the set of advertisements to select one of the advertisements.

7. The method of claim 6, wherein the user profile information is downloaded from a mobile device that is in communication with the smart glasses.

8. An apparatus for presenting advertisements based on emotions of a viewer, the apparatus comprising:
- a frame comprising a display glass;
- an eye movement sensor;
- a memory storing a computer program; and
- a processor configured to execute the computer program,
- wherein the computer program is configured to detect a first emotional state of a viewer experienced in response to observing an initial advertisement, the viewer wearing the frame, the detecting using first sensor data captured by the sensor, set a rate to a first rate when the first emotional state indicates the viewer is experiencing a negative emotion towards the initial advertisement, set the rate to a second rate when the first emotional state indicates the viewer is experiencing a positive emotion towards the initial advertisement, and display a set of advertisements on the display glass according to the set rate while a movie is played so that the set of advertisements are perceived by the viewer as overlaying the movie, where the first rate is less than the second rate,
- wherein the display of the set of advertisements includes displaying a first advertisement, from among the set of advertisements, in a first frame of the movie,
- wherein the first frame of the movie is analyzed by the computer program to detect an interesting area and an uninteresting area, wherein the interesting area includes more objects than the uninteresting area, and
- wherein displaying the first advertisement includes placing the first advertisement in the uninteresting area,
- wherein the set rate is a number of advertisements to display during a given time period.

9. The apparatus of claim 8, wherein the positive emotion indicates the viewer is interested, and the negative emotion indicates the viewer is dis-interested.

10. The apparatus of claim 8, wherein the computer program detects a second emotional state of the viewer after the advertisements have been overlayed using second sensor data captured by the sensor, and determines whether the rate should be adjusted based on the detected second emotional state.

11. The apparatus of claim 10, wherein the computer program decreases the previously set rate when the detected second emotional state corresponds to a negative emotion, and maintains the previously set rate when the detected second emotional state does not correspond to a negative emotion.

12. The apparatus of claim 8, further comprising a projector, wherein the computer program projects the movie onto the display glass using the projector.

13. The apparatus of claim 8, wherein the sensor is a camera.

14. A system for presenting advertisements based on emotions of a viewer, the system comprising:
- smart glasses configured to detect a first emotional state of a viewer experienced in response to observing an initial advertisement using first sensor data captured by a sensor, set a rate to a first rate when the first emotional state indicates the viewer is experiencing a positive emotion towards the initial advertisement, set the rate to a second rate when the first emotional state indicates the viewer is experiencing a negative emotion towards the initial advertisement, and display a subset of advertisements according to the set rate while a movie is played so that the subset of advertisements are perceived by the viewer as overlaying the movie, wherein the first rate is less than the second rate; and
- a server configured to send a set of advertisements comprising the subset to the smart glasses,
- wherein the display of the subset of advertisements includes displaying a first advertisement, from among the subset of advertisements in a first frame of the movie,
- wherein the first frame of the movie is analyzed by the smart glasses to detect an interesting area and an uninteresting area,
- wherein the interesting area includes more objects than the uninteresting area, and wherein displaying the first advertisement includes placing the first advertisement in the uninteresting area,
- wherein the set rate is a number of advertisements to display during a given time period.

15. The system of claim 14, wherein the smart glasses displays the advertisements by selecting the subset of the advertisements from the set of advertisements based on meta-data associated with the movie and meta-data associated with the set of advertisements, and maps each advertisement of the selected set to a given frame of the movie and a position within the frame.

16. The system of claim 15, wherein the smart glasses are configured to receive user profile information from a remote mobile device, and perform the mapping by comparing meta-data within the user profile information against meta-data of the subset of advertisements to select one of the advertisements, and set a position of the selected one advertisement to a position in the frame.

* * * * *